United States Patent [19]

Maklad

[11] 4,184,859
[45] Jan. 22, 1980

[54] METHOD OF FABRICATING AN ELLIPTICAL CORE SINGLE MODE FIBER

[75] Inventor: Mokhtar S. Maklad, Roanoke, Va.

[73] Assignee: International Telephone and Telegraph Corporation, Nutley, N.J.

[21] Appl. No.: 914,246

[22] Filed: Jun. 9, 1978

[51] Int. Cl.$^2$ .............................................. C03B 37/02
[52] U.S. Cl. ........................................... 65/2; 65/3 A; 65/13; 350/96.31
[58] Field of Search ............... 65/2, 3 A, 13, 108–110, 65/DIG. 7; 350/96.31

[56] References Cited

U.S. PATENT DOCUMENTS

| | | | |
|---|---|---|---|
| 3,243,278 | 3/1966 | Olsen et al. | 65/109 X |
| 3,293,019 | 12/1966 | Nitsche et al. | 65/110 |
| 3,982,916 | 9/1976 | Miller | 65/3 A |
| 4,046,537 | 9/1977 | Deserno et al. | 65/2 |

Primary Examiner—Robert L. Lindsay, Jr.
Attorney, Agent, or Firm—John T. O'Halloran; Philip Sperber

[57] ABSTRACT

A method of fabricating a low loss single mode optical fiber having an elliptically shaped core comprising subjecting a multi-layered coated substrate having at least a barrier, cladding and core layer to partial collapse, first on one side and then on the other side, to produce an intermediate product having a substantially cross-sectional elliptical shape of at least the core layer. This is followed by collapsing the composite structure into a cylindrical shaped optical fiber preform having an elliptically shaped core portion which is then heated and drawn into a single mode optical fiber having an elliptically shaped core portion.

6 Claims, 5 Drawing Figures

METHOD OF FABRICATING AN ELLIPTICAL CORE SINGLE MODE FIBER

BACKGROUND OF THE INVENTION

In the utilization of single mode fibers for high bandwidth information transfer or for phase modulation applications, it is desirable to maintain the plane of polarization of polarized light or to force the polarization of unpolarized light. A single mode fiber with an elliptical core will maintain the plane of polarization of the injected light.

Low loss single mode optical fibers are preferably used in specified applications, for example in laser gyros; sonar detectors; interfacing elements, particularly interfacing optical fibers with integrated optic devices which use plane polarized light; and, particularly important, are high data rate communication systems.

It is well known in the field of optical fibers that single mode fibers are either required or desirable for the above listed applications and others. The problem to date has been to develop a method of fabricating a low loss single mode optical fiber which either maintains the polarized nature of polarized light or, by virtue of the geometry involved, will force the polarization of unpolarized light.

A number of workers in the field have published articles relating generally to the effect of ellipticity of the fiber core; have examined the magneto-optical properties of index-gradient optical fibers; have studied the delayed distortion in glass fiber optical waveguides due to small elliptical deformations of the cross-section; have studied the linear and circular birefringence properties of low loss single mode glass fibers which depend upon length; have studied the influence of a noncircular core on the polarization performance of single mode fibers; and have studied the polarization effects in short lengths of single mode fibers. References to the foregoing are found in the following publications:

1. Harms, H., Papp, A., and Kempter, "Magneto-optical Properties of Index Gradient Optical Fibers". App. Optics, 15, 3 pp 799–801, 1976.
2. Schlosser, W. O., "Delay Distortion of Weakly Guiding Optical Fibers Due to Elliptic Deformation of Boundary". B.S.T.J., 51, 2, pp 487–492, 1972.
3. Kapron, F. P., Borelli, N. F. and Keck, D. B. "Birefingence in Dielectric Optical Waveguides". IEEE Journal of Quantum Electronics QE-8, 2, pp 222–225, 1972.
4. Ramaswamy, V. and W. G. French, "Influence of Noncircular Core on the Polarization Performance of Single Mode Fibres", Electronics Letters, 14, 5, pp 143–144, 1978.
5. Ramaswamy, V., Standley, R. D., Sze, D., and French, W. G., "Polarization Effects in Short Length, Single Mode Fibers ", B.S.T.J. 57, 3, pp 635–651, 1978.

None of the above references teach an efficient, reproducible method of fabricating a low loss single mode polarizing optical fiber.

SUMMARY OF THE INVENTION

The object of this invention is to provide a method for fabricating elliptical core single mode fibers by first preparing a substrate hollow silica tube to remove contaminants which may be present both on the inside of the tube's bore and outside of the tube. The tube is then fire polished inside and out while the bore is under positive pressure, to smooth out and remove the moisture from the bore of the tube. This is accomplished by mounting the tube or substrate on a rotating lathe while accomplishing fire polish inside and out while maintaining positive pressure on the inside of the tube. While the tube is rotating a barrier layer of silica is deposited on the bore by passing a mixture of dry $SiCl_4 + O_2$ while heating the tube with a traversing oxy-hydrogen flame to produce a glassy film barrier layer on the bore of the tube, for example, about 2 $\mu m$ thick barrier layer, at the rate of about 1 $\mu m$ per pass.

After the barrier layer of pure $SiO_2$ has been deposited, a cladding layer of borosilicate glass doped with phosphorus pentoxide ($P_2O_5$) is layed down in approximately 50 passes to produce 50 layers, for a cladding layer thickness of about 1 mm. This is followed by depositing the core composition which will be described in detail later. During this period of time, starting with the mounting of the tube on the lathe through completion of the deposit of the core layer, the tube is rotated by the glass lathe and the flame or heat source is traversed from one end of the tube to the other.

The next step begins a novel collapsing process to produce a preform which can be used to produce a single mode optical fiber having an elliptical core. First the inside of the tube is subjected to a partial vacuum and rotating of the lathe stopped. One side of the tube is subjected to heat, for example an oxy-hydrogen flame, so that the heat will be concentrated at the interface between the heat source and the side of the coated tube closest to it. The heat source is such that the collapsing temperature is reached at that area of the coated tube closest to it, following which the flame or other heat source is longitudinally traversed at a speed allowing for a partial collapse of one side of the coated tube until the desired significant collapsing has been achieved all along one side of the coated tube. At this point, the coated tube is rotated 180' and the opposite side is subjected to the effect of the heat source on the side of the tube adjacent it to achieve the desired substantial degree of partial collapse.

Once the two sides of the coated tube have been partially collapsed, then the lathe is started up to rotate the partially collapsed coated tube and heat is supplied so that the entire periphery of the tube is heated to cause complete collapse of the bore and to produce a cylindrically shaped solid optical fiber preform having an elliptically shaped core. Preferably the conditions of partial collapse are associated with the composition of the core and cladding layers so as to produce a single mode core having a substantially elliptical cross-sectional shape in which the major axis to minor axis ratio is about 2:1.

Next step is to draw the fiber in the usual manner thus producing an optical fiber of the single mode type which has a substantially elliptical shaped core.

DESCRIPTION OF THE PREFERRED EMBODIMENTS

Figure 1:
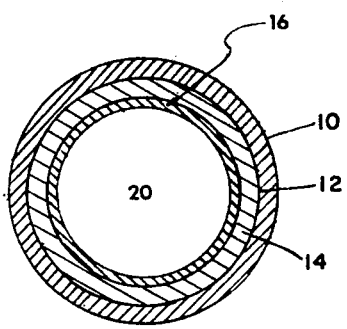
FIG. 1 is a cross-sectional view of a coated tube substrate illustrating the general shape at this starting step of the process of this invention.
Figure 2:
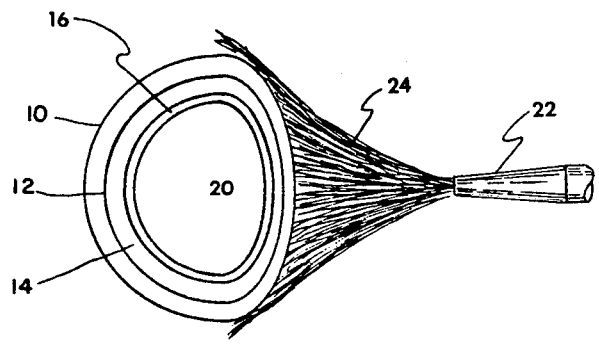
FIG. 2 is a cross-sectional view of a coated substrate tube illustrating the effect of subjecting one side of such a tube to a heat source to cause partial collapse of the bore on that side.
Figure 3:
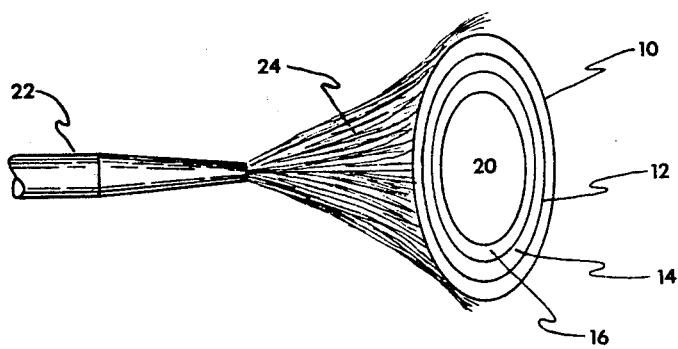
FIG. 3 is a cross-sectional view illustrating the result of the step of subjecting the opposite side of the tube to a collapsing temperature.

Referring to FIGS. 1–3, it will be seen that in FIG. 1 there is illustrated the resultant intermediate product made by the selection and preparation of a hollow tubular substrate 10 to which has been applied a substantially pure silica barrier layer 12. The barrier layer 12 is relatively thin and accordingly for purposes of illustration is shown as a line. It will be understood by those of skill in the art that the figures do not make any effort to be accurate dimensionally but instead are designed to illustrate the features of this invention.

Following the application of the barrier layer 12, as a glassy thin layer of, for example silica, a relatively thick cladding layer 14 is deposited on the barrier layer utilizing the process known in the art as modified chemical vapor deposition (MCVD). One preferred material for the cladding layer is a borosilicate glass doped with phosphorus pentoxide ($P_2O_5$). The cladding layer is applied using the MCVD process involving rotating the substrate 10 and traversing a heat source or flame sufficiently hot to cause the reactant materials, in vapor form, to produce the desired cladding layer 14 material as a glassy layer. Upon completion of the formation of the cladding layer, the core layer is likewise deposited on the inside of the bore 20 and onto the surface of the cladding layer 14. The resultant product is a multi-layer coated substrate or tube 10 having a barrier layer 12, a cladding layer 14, and a core layer 16 on the bore 20.

FIG. 2 illustrates one way of starting the novel collapsing step of this invention utilized to achieve an optical fiber preform 26 having an elliptically shaped core portion 25. In FIG. 2, a nozzle 22 of an oxy-hydrogen burner (not shown) produces an oxy-hydrogen flame 24 which is directed onto one side of the structure illustrated in FIG. 1. The normal rotation of the coated tube illustrated in FIG. 1 by a glass lathe (not shown) is halted so that the coated tube illustrated in FIG. 1 does not rotate, it being understood that during the deposition process used to form the barrier layer 12, cladding layer 14, and core layer 16, the tube, with the substrate 10, is normally rotated at a constant speed by a glass lathe to promote uniformity of the deposition of the various layers in the bore 20. Similarly, during the coating process, an oxyhydrogen flame 24 or other heat source is utilized so that the entire periphery of the substrate 10 is subjected to heat sufficient to cause the reactants in vapor form to react within the bore and to form a layer of glass-like material for each of the barrier, cladding and core layers 12, 14, 16.

In preparation for the step of the process illustrated in FIG. 2, the rotation of the substrate 10 is halted and a partial vacuum is drawn on the bore 20. At the same time, heat is removed from all but one side of the structure illustrated in FIG. 1. The traversing of the nozzle 22 is stopped momentarily until the structure illustrated in FIG. 1 on the side adjacent to the flame 24 (or other heat source) reaches a temperature at which the desired significant collapsing condition is reached. At this point, due to surface tension and the characteristics of the cladding and core layers 14, 16, the composite structure of FIG. 1 assumes the generally flattened configuration as illustrated in FIG. 2, at that point or area which is subjected to the heat source or flame 24. At this time, the nozzle 22 is traversed along the length of the composite structure so as to achieve uniform collapse along the length of the tube.

Once that degree of collapse on that one side of the composite structure has been achieved, the tube or substrate 10 is rotated through 180° and the same nozzle 22 and flame 24 combination is applied to the opposite side of the composite structure. Alternately, a similar nozzle 22 and flame 24 are started up and directed onto the opposite side of the composite structure illustrated in FIG. 2. In either instance, the composite structure is heated on the side opposite to that at which partial collapse has occurred until the collapsing condition is reached at which point the heat source or flame 24 is traversed the length of the composite structure, as illustrated in FIG. 3, to achieve uniform collapse of that opposite side of the tube or substrate 10 and its deposited or coated layers 12, 14, 16. It might also be arranged to partially collapse both sides simultaneously.

The result of the process illustrated in FIGS. 2 and 3 (not to scale) is that the structure has a substantial opening remaining there through its hollow area or bore 20, and the various layers have achieved a somewhat elliptical shape, preferably so that at least the core layer 16 has an elliptical cross-section in which the major to minor axis ratio is about 2:1.

Figure 4:
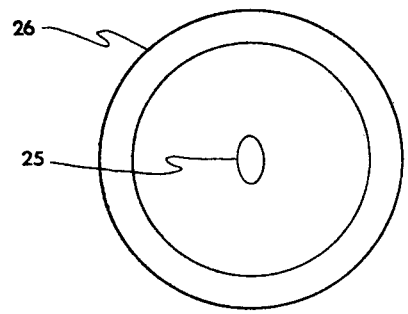
FIG. 4 is a cross-sectional view of the completed cylindrical preform following the collapsing step.

Following the completion of the steps illustrated in FIGS. 2 and 3, the structure illustrated in FIG. 3 of the coated tube is subjected to a collapsing step to eliminate the bore 20 to form a cylindrically shaped solid preform 26 illustrated in FIG. 4 having a substantially elliptically shaped core 25. The collapsing step used to produce the preform 26 involves application of heat to the rotating structure illustrated in FIG. 3 and includes the traversing of a heat source while rotating the structure in a glass lathe such that a cylindrically shaped preform 26 is formed. It will be appreciated that the various layers 10, 12, 14, 16 could be illustrated in cross-hatching in FIGS. 2, 3, 4, and 5 but for the purpose of illustration, it is to be understood that the preform 26 illustrated in FIG. 4 consists of the outer concentric layer formed by the substrate 10, a barrier layer illustrated by the line or concentric circle, followed by the cladding layer 14 which surrounds the elliptical shaped core 25.

Figure 5:
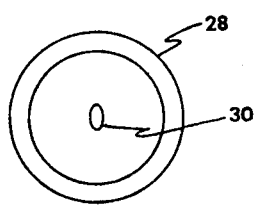
FIG. 5 is a view similar to FIG. 4, except that illustrated is geometry involved in a single mode fibers having an elliptical core cross-section.

Following the completion of the preform 26, standard optical fiber drawing techniques are employed to produce an optical fiber 28 having an elliptically shaped core 30. Again, it is to be understood that FIG. 5 is not to scale and is merely for the purpose of illustrating the relative change in cross-section of the preform 26 and the complete fiber 28.

As one specific example of the techniques of this invention, the following is a description used to produce a single mode optical fiber having an elliptical core 30 suitable for maintaining the plane of polarization of injected polarized light or for forcing the polarization of injected non-polarized light.

A fused silica tube 10 is selected, for example, an "Amersil WG" which has an OD of 15 mm and an ID of 13 mm and a length of 20 inches. The tube or substrate 10 is prepared for the deposition process by etching it with a 50:50 mixture of hydrofluoric and nitric acids in order to remove residual contaminants. Further, decontamination involves cleaning with methanol followed by drying the cleaned tube in dry nitrogen gas. Next, the substrate 10 is mounted on a glass lathe and rotated. The substrate 10 and its bore 20 are fire polished both inside the bore and the outside surface, while maintaining positive pressure on the inside of the tube in order to smooth out the tube's bore and to dry it to eliminate any residual moisture or OH groups.

While maintaining the tube's rotation, a mixture of dry $SiCl_4 + O_2$ is introduced into the bore 20, while being subjected to a longitudinally traversing hot zone, which may be the oxy-hydrogen flame directed so as to cover the periphery of the substrate 10. The heat from the heat source causes the reaction of the vapor form ingredients to cause the in situ deposition of substantially pure $SiO_2$ as a thin barrier layer 12. In this example, two passes of the traversing heat source were used to deposit a 2 μm thick barrier layer 12 on substrate 10.

The next step in preparing the structure illustrated in FIG. 1 involves depositing a 1 mm thick layer of borosilicate glass doped with phosphorus pentoxide cladding layer. In this instance, about 50 passes of the traversing hot zone, the oxy-hydrogen flame, was sufficient to produce approximately a 1 mm thick cladding layer. Following the formation of the cladding layer 14, using the MCVD process or any similar suitable process, a core layer of germania doped silica is deposited to produce a core layer which is less than 1μm thick. In this example, the core layer 16 was produced in ten passes of the traversing hot zone.

Following the completion of the composite structure illustrated in FIG. 1 as described above, the two-step partial collapse of the structure illustrated in FIG. 1 was achieved as described above and as illustrated in FIGS. 2 and 3. Next the collapse to the solid preform 26 as illustrated in FIG. 4 was achieved utilizing known techniques. It will be understood by those with skill in the art that the structure of FIG. 3 when rotated and subjected to heat around its periphery while rotating, with the heat source traversing, will go from the substantially elliptical shape illustrated in FIG. 3 to the cylindrical shape illustrated in FIG. 4 of the preform 26, principally due to the surface tension effect as the bore 20 is collapsed into the solid structure illustrated in FIG. 4. The final step of drawing the optical fiber 28 with its elliptically shaped core 30 illustrated in FIG. 5 is likewise accomplished utilizing standard techniques.

When the preform 26 was drawn into fiber 28, it retained its other cylindrical shape and the elliptically shaped core 30. The single mode fiber had a loss at 0.63 μm equal to 8.13 dB/km. Polarized light was detected at the fiber's output when injected with either polarized or non-polarized light. The ratio of power intensity between the major and minor axis was 20 dB.

It will also be appreciated that the outer surface of fiber 28 may have one or more protective or strengthening layers added during or following the drawing of the fiber step.

The above example is merely a way of illustrating techniques suitable for fabricating a single mode optical fiber having an elliptically shaped core portion. Other techniques may be employed which do not depart from the scope and subject matter of the following claims.

I claim:

1. A method of fabricating an optical fiber suitable for transmission of a single mode of injected light through a substantially elliptically shaped core portion, comprising the steps of:
   preparing a multi-layered coated tube having at least a substrate, cladding and core layers of glass;
   heating said coated tube along the length of one side to a temperature sufficient to cause partial collapse of said one side;
   heating along the length of the opposite side of said coated tube to a sufficient temperature to cause partial collapse of said opposite side of said coated tube; and
   collapsing said partially collapsed coated tube to form a substantially cylindrically shaped optical fiber preform having a substantially elliptically shaped core portion.

2. The method of claim 1 including the further step of subjecting the said optical fiber preform to heat sufficient to soften said preform and drawing said preform to form an optical fiber having an elliptically shaped core portion.

3. The method of claim 1 wherein the partial collapsing steps are conducted so that when said collapsing step is performed, said core portion's elliptical shape has a major to minor axis ratio of about 2:1.

4. The method of claim 2 wherein the partial collapsing steps are conducted so that when said collapsing step is performed, said core portion's elliptical shape has a major to minor axis ratio of about 2:1.

5. The method of claim 1, claim 2, claim 3, or claim 4 wherein during said partial said collapsing steps a partial vacuum is drawn on the bore of said coated tube.

6. A method of fabricating a low loss single mode optical fiber having an elliptically shaped core comprising the steps of:
   selecting, cleaning, drying, and polishing a fused silica tube substrate;
   depositing a barrier layer of substantially pure silica on the bore of said tube, depositing a cladding layer on said barrier layer, and depositing a core layer on said cladding layer, each of said layers being formed by a modified chemical vapor deposition process while rotating said tube and subjecting said tube to a traversing hot zone which produces an amount of heat sufficient to cause each of the layer forming materials to react and to deposit each of said layers as glass;
   subjecting said coated tube to heat sufficient to cause partial collapse of said coated tube on only one side of said tube, at a same time while drawing a partial vacuum on the bore of said coated tube and traversing said hot zone to cause partial collapse of one side of said tube;
   subjecting the opposite side of said tube to said heat source to cause partial collapse of said opposite side followed by traversing said hot zone along said opposite side to cause uniform partial collapse of said tube;
   subjecting said partially collapsed tube to rotation and exposure to collapsing temperature, traversing said hot zone to collapse said partially collapsed tube into a solid optical fiber preform having an elliptically shaped core portion; and
   drawing said preform into an optical fiber having an elliptically shaped core suitable for transmission of polarized injected light through said core.

* * * * *